US009745706B2

(12) United States Patent
Baban et al.

(10) Patent No.: US 9,745,706 B2
(45) Date of Patent: Aug. 29, 2017

(54) POSITIONABLE WARNING SIGN DEVICE

(71) Applicants: Venut Baban, Gurnee, IL (US); Justin Romonti, Gurnee, IL (US)

(72) Inventors: Venut Baban, Gurnee, IL (US); Justin Romonti, Gurnee, IL (US)

(*) Notice: Subject to any disclaimer, the term of this patent is extended or adjusted under 35 U.S.C. 154(b) by 159 days.

(21) Appl. No.: 14/719,572

(22) Filed: May 22, 2015

(65) Prior Publication Data
US 2016/0340845 A1  Nov. 24, 2016

(51) Int. Cl.
| *E01F 9/00* | (2016.01) |
| *E01F 9/011* | (2006.01) |
| *B60Q 7/00* | (2006.01) |
| *F16M 11/24* | (2006.01) |
| *F16M 11/04* | (2006.01) |
| *F16M 11/16* | (2006.01) |
| *F16M 11/18* | (2006.01) |
| *E01F 9/60* | (2016.01) |
| *E01F 9/688* | (2016.01) |

(52) U.S. Cl.
CPC .............. *E01F 9/0111* (2013.01); *B60Q 7/00* (2013.01); *E01F 9/00* (2013.01); *E01F 9/60* (2016.02); *E01F 9/688* (2016.02); *F16M 11/04* (2013.01); *F16M 11/16* (2013.01); *F16M 11/18* (2013.01); *F16M 11/242* (2013.01)

(58) Field of Classification Search
CPC .. B60Q 7/00; E01F 9/0111; E01F 9/00; E01F 9/60; E01F 9/688; F16M 11/242; F16M 11/04; F16M 11/16; F16M 11/18
USPC ...... 116/28 R, 63 T, 63 P, 63 R; 40/610, 612
See application file for complete search history.

(56) References Cited

U.S. PATENT DOCUMENTS

| 1,431,932 | A | * | 10/1922 | Carey | B60Q 1/34 116/48 |
| 1,497,958 | A | * | 6/1924 | Swinford | G08G 1/09 40/612 |
| 2,806,670 | A | * | 9/1957 | Straster | B60Q 7/005 116/63 P |
| 2,903,688 | A |   | 9/1959 | Sorensen | |
| 3,162,836 | A | * | 12/1964 | Vereugdenhii | B60Q 1/2615 340/984 |
| 3,219,010 | A | * | 11/1965 | Hyatt | G09F 17/00 116/173 |
| 3,223,387 | A | * | 12/1965 | Magliocco | E01F 13/02 116/63 P |
| 3,239,176 | A | * | 3/1966 | Johnson | G01C 15/06 248/166 |
| 3,622,980 | A | * | 11/1971 | Elledge, Jr. | G08G 1/096716 296/21 |

(Continued)

*Primary Examiner* — R. A. Smith
*Assistant Examiner* — Tania Courson

(57) ABSTRACT

A positionable warning sign device provides a portable unit which facilitates identification of a traffic hazard. The device includes a primary member, a first arm, and a second arm. The first and second arms are coupled to the primary member and pivotally positionable to form an end of an arrow. Light emitters are coupled to respective front walls of the primary member, the first arm and the second arm. Arcuate projections extend from the primary member defining a receiver. A projection extends upwardly from a top end of a tripod. An upper portion of the projection is insertable into the receiver whereby the primary member is coupled to the tripod and supported on the lip. A power supply is operationally coupled to the plurality of light emitters.

14 Claims, 3 Drawing Sheets

(56) References Cited

U.S. PATENT DOCUMENTS

| | | |
|---|---|---|
| D234,754 S | 4/1975 | Hall |
| 4,430,638 A | 2/1984 | Parker |
| 4,440,104 A | 4/1984 | Bleiweiss et al. |
| 4,759,606 A * | 7/1988 | McDowell ............. B60Q 7/005 116/63 P |
| 5,097,612 A * | 3/1992 | Williams ................ E01F 9/662 116/28 R |
| 5,103,205 A * | 4/1992 | Halligan ................. B60Q 7/00 116/48 |
| 5,606,309 A | 2/1997 | Smith |
| 5,680,121 A | 10/1997 | Shiozaki et al. |
| 6,138,394 A | 10/2000 | Sulenski |
| 6,237,883 B1 * | 5/2001 | Levin ...................... E01F 9/688 248/176.1 |
| 6,443,407 B1 * | 9/2002 | Ibrahim ................. F16M 11/34 248/163.2 |
| 6,637,904 B2 | 10/2003 | Hernandez |
| 6,857,385 B1 | 2/2005 | Chen |
| 6,948,446 B2 | 9/2005 | Greves |
| 7,047,960 B2 * | 5/2006 | McCrea ................ F41B 5/1426 124/86 |
| 7,158,020 B2 | 1/2007 | Grady, Jr. |
| 7,363,874 B1 * | 4/2008 | Arne ...................... G09F 17/00 116/173 |
| 7,370,602 B2 | 5/2008 | Greves |
| 8,631,755 B2 * | 1/2014 | Klein .................... E01F 13/028 116/63 C |
| 2004/0255839 A1 | 12/2004 | Greves |
| 2009/0084304 A1 * | 4/2009 | Hatcher ................ B60Q 7/005 116/28 R |
| 2013/0015288 A1 * | 1/2013 | Hernandez ............. F16B 2/245 244/3.1 |

* cited by examiner

POSITIONABLE WARNING SIGN DEVICE

BACKGROUND OF THE DISCLOSURE

Field of the Disclosure

The disclosure relates to warning sign devices and more particularly pertains to a new warning sign device for providing a portable unit which facilitates identification of a traffic hazard.

SUMMARY OF THE DISCLOSURE

An embodiment of the disclosure meets the needs presented above by generally comprising a primary member, a first arm, and a second arm. The first and second arms are coupled to the primary member and pivotally positionable to form an end of an arrow. Light emitters are coupled to respective front walls of the primary member, the first arm and the second arm. Arcuate projections extend from the primary member defining a receiver. A projection extends upwardly from a top end of a tripod. An upper portion of the projection is insertable into the receiver whereby the primary member is coupled to the tripod and supported on the lip. A power supply is operationally coupled to the plurality of light emitters.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
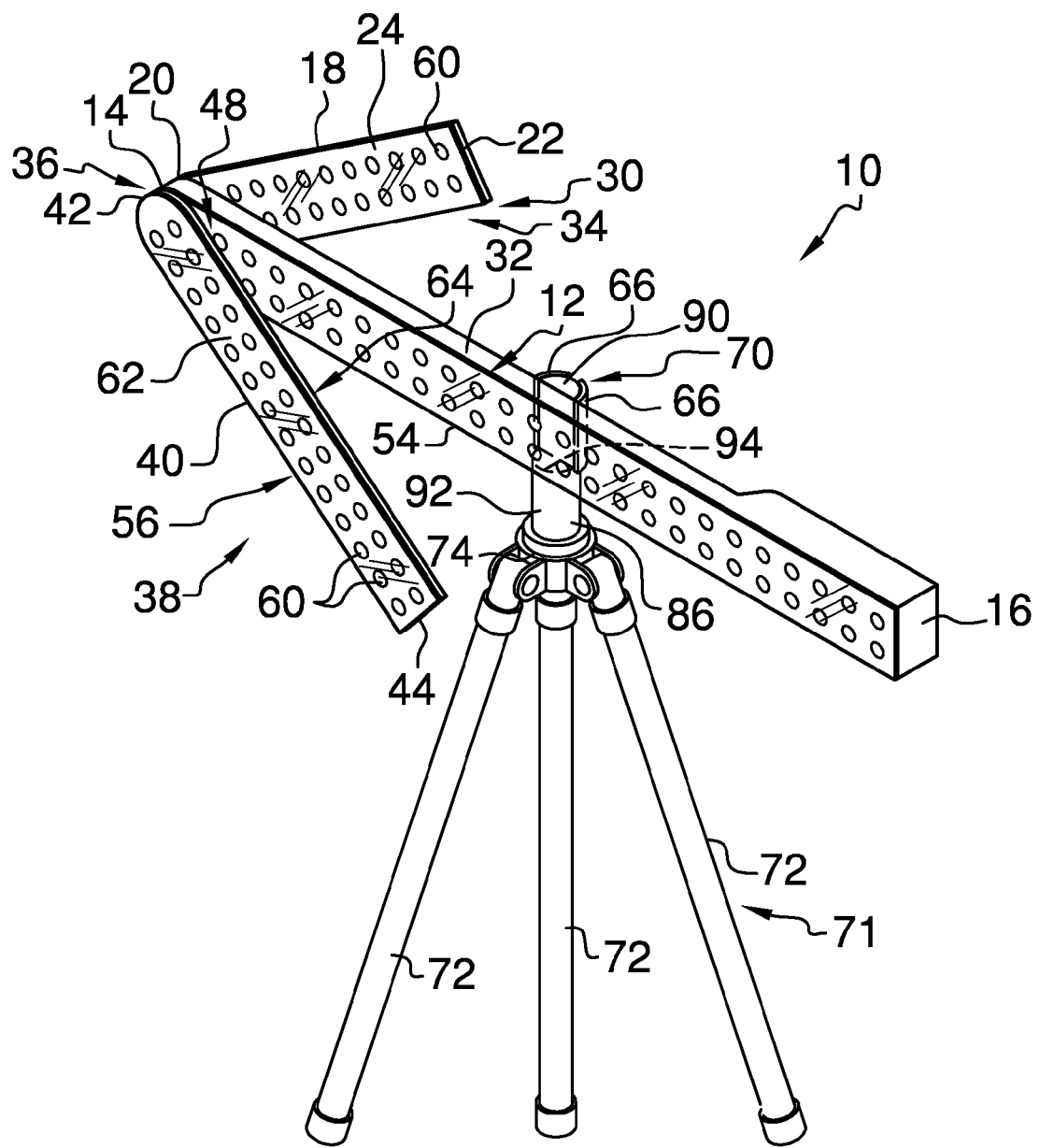
FIG. 1 is a top front side perspective view of a positionable warning sign device according to an embodiment of the disclosure.
Figure 2:
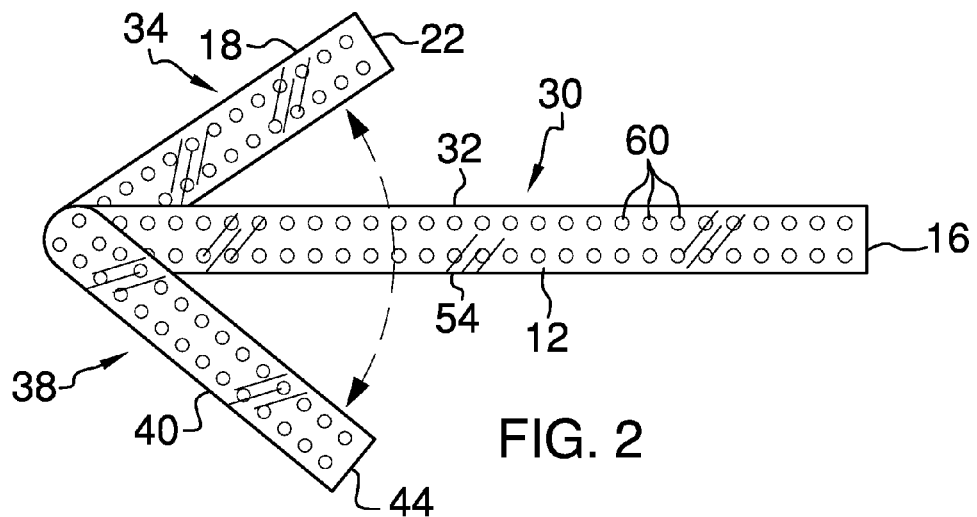
FIG. 2 is a front view of an embodiment of the disclosure in a use position.
Figure 3:
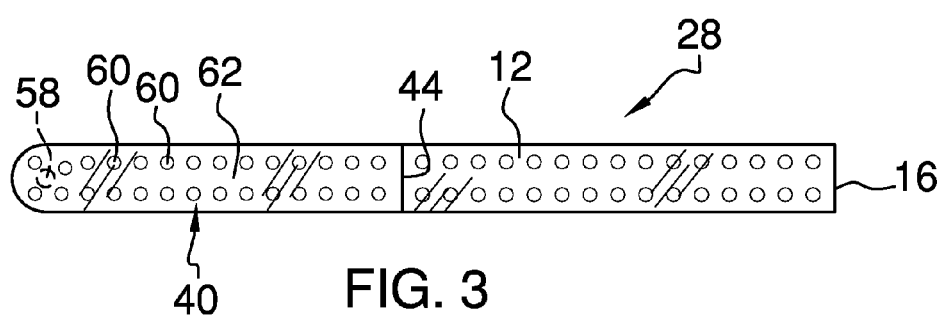
FIG. 3 is a front view of an embodiment of the disclosure in a storage position.
Figure 4:
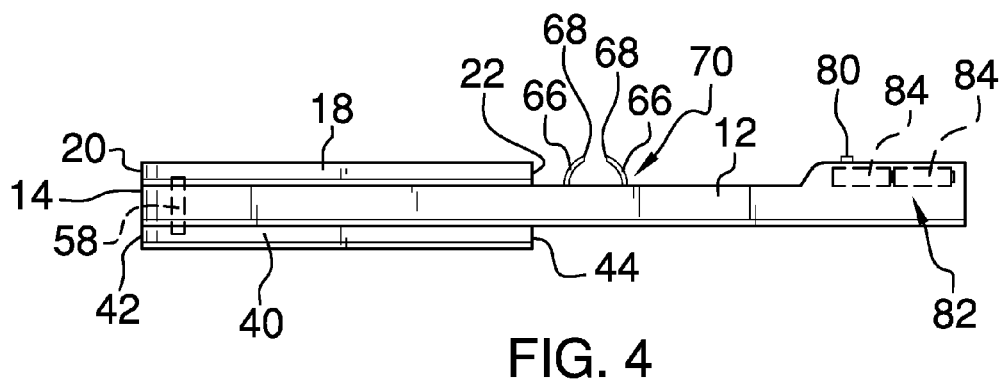
FIG. 4 is a bottom view of an embodiment of the disclosure.
Figure 5:
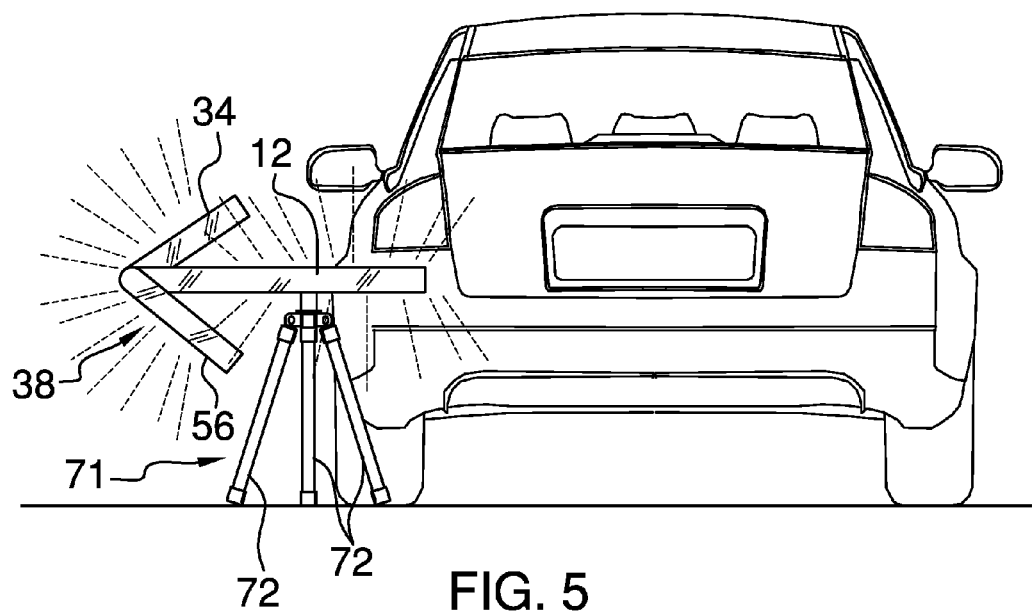
FIG. 5 is a front view of an embodiment of the disclosure in use.

With reference now to the drawings, and in particular to FIGS. 1 through 5 thereof, a new warning sign device embodying the principles and concepts of an embodiment of the disclosure and generally designated by the reference numeral 10 will be described.

As best illustrated in FIGS. 1 through 5, the positionable warning sign device 10 generally comprises a primary member 12 having a first end 14 and a second end 16. A first arm 18 has a first end 20 and a second end 22. The first end 20 of the first arm 18 is rotatably coupled to the first end 14 of the primary member 12 such that a front wall 24 of the first arm 18 abuts a rear wall 26 of the primary member 12. The first arm 18 is positionable in a stored position 28 such that the first arm 18 is coextensive with the primary member 12. The first arm 18 is positionable in a deployed position 30 such that the second end 22 of the first arm 18 is positioned upwardly from a top wall 32 of the primary member 12 whereby the first arm 18 forms a top portion 34 of an end 36 of an arrow 38. A second arm 40 has a first end 42 and a second end 44. The first end 42 of the second arm 40 is rotatably coupled to the primary member 12 such that a rear wall 64 of the second arm 40 abuts a front wall 48 of the primary member 12. The second arm 40 is positionable in the stored position 28 such that the second arm 40 is coextensive with the primary member 12. The second arm 40 is positionable in the deployed position 30 such that the second end 44 of the second arm 40 is positioned downwardly from a bottom wall 54 of the primary member 12 whereby the second arm 40 forms a bottom portion 56 of the end 36 of the arrow 38. The first and second arms 18,40 are positionable in the deployed position 30 to form the arrow 38 whereby the first and second arms 18,40 are configured to direct on-coming traffic around a hazard.

A pin 58 extends through the first end 14 of the primary member 12, the first end 20 of the first arm 18 and the first end 42 of the second arm 40 whereby the first arm 18 is rotatably coupled to the primary member 12 and the second arm 40 is rotatably coupled to the first arm 18.

A plurality of light emitters 60 is coupled to the front wall 48 of the primary member 12, the front wall 24 of the first arm 18 and a front wall 62 of the second arm 40 whereby the light emitters 60 are configured to be visible to on-coming traffic. The light emitters 60 may be arranged into rows of transversely aligned pairs of the light emitters 60.

A pair of arcuate projections 66 extends from the rear wall 26 of the primary member 12. Distal ends 68 of the arcuate projections 66 are aligned and spaced apart such that the arcuate projections 66 define a receiver 70 oriented transversely relative to the primary member 12. A tripod 71 has a plurality of legs 72 coupled to and extending downwardly from a top end 74 of the tripod 71. A projection 86 extends upwardly from the top end 74 of the tripod 71. An upper portion 90 of the projection 86 has a transverse cross-sectional shape complementary to the receiver 70. A lower portion 92 of the projection 86 defines a lip 94 extending from the upper portion 90 of the projection 86 whereby the upper portion 90 of the projection 86 is insertable into the receiver 70 whereby the primary member 12 is coupled to the tripod 71 and supported on the lip 94. A respective bottom end 76 of each of the legs 72 is configured to abut a support surface 78 such that the primary member 12 is supported above the support surface 78.

An actuator 80 is coupled to the primary member 12. The actuator 80 is electrically coupled to the light emitters 60. The actuator 80 actuates the light emitters 60 such that the light emitters 60 emit light whereby the light emitters 60 are configured to alert on-coming traffic to a hazard. A power supply 82 is coupled to the primary member 12. The power supply 82 is electrically coupled to the actuator 80 and the light emitters 60. The power supply 82 comprises at least one battery 84.

In use, the primary member 12 is supported on the tripod 70 and the first arm 18 and the second arm 40 are each positioned to form the arrow 38. The actuator 80 is operated to illuminate the light emitters 60. The device 10 is positioned in a desired location to indicate a desired path of travel for traffic.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A rotatably positionable warning sign assembly comprising:
   a primary member having a first end and a second end;
   a first arm being rotatably coupled to said first end of said primary member;
   a second arm being rotatably coupled to said first end of said primary member and aligned with said first arm such that said first and second arms are pivotally positionable to form an end of an arrow extending from said first end of said primary member;
   a plurality of light emitters being coupled to respective front walls of said primary member, said first arm and said second arm;
   a pair of arcuate projections extending from a back wall of said primary member, distal ends of said arcuate projections being aligned and spaced apart such that said arcuate projections define a receiver oriented transversely relative to said primary member;
   a tripod having a plurality of legs coupled to and extending downwardly from a top end of said tripod;
   a projection extending upwardly from said top end of said tripod, an upper portion of said projection having a transverse cross-sectional shape complementary to said receiver, a lower portion of said projection defining a lip extending from said upper portion of said projection whereby said upper portion of said projection is insertable into said receiver whereby said primary member is coupled to said tripod and supported on said lip, a bottom end of said legs being configured to abut said support surface such that said primary member is supported above said support surface; and
   a power supply coupled to said primary member, said power supply being operationally coupled to said plurality of light emitters.

2. The assembly according to claim 1, further including said first arm having a first end and a second end, said first end of said first arm being rotatably coupled to said first end of said primary member such that a front wall of said first arm abuts a rear wall of said primary member.

3. The assembly according to claim 2, further including said second arm having a first end and a second end, said first end of said second arm being rotatably coupled to said primary member such that said rear wall of said second arm abuts a front wall of said primary member.

4. The assembly according to claim 1, further including a pin extending through said first end of said primary member, said first end of said first arm and said first end of said second arm whereby said first arm is rotatably coupled to said primary member and said second arm is rotatably coupled to said primary member.

5. The assembly according to claim 1, further including said first arm being positionable in a stored position such that said first arm is coextensive with said primary member.

6. The assembly according to claim 1, further comprising:
   said first arm having a second end;
   said first arm being positionable in a deployed position such that said second end of said first arm is positioned upwardly from a top wall of said primary member whereby said first arm forms a top portion of the end of the arrow.

7. The assembly according to claim 1, further including said second arm being positionable in a stored position such that said second arm is coextensive with said primary member.

8. The assembly according to claim 1, further comprising:
   said second arm having a second end;
   said second arm being positionable in a deployed position such that said second end of said second arm is positioned downwardly from a bottom wall of said primary member whereby said second arm forms a bottom portion of the end of the arrow.

9. The assembly according to claim 1, further comprising said first and second arms each being positionable in a deployed position to form the arrow whereby said first and second arms are configured to direct on-coming traffic around a hazard.

10. The assembly according to claim 1, further including said plurality of light emitters being coupled to a front wall of said primary member, a front wall of said first arm and a front wall of said second arm whereby said light emitters are configured to be visible to on-coming traffic.

11. The assembly according to claim 1, further including an actuator coupled to said primary member, said actuator being electrically coupled to said light emitters, said actuator actuating said light emitters such that said light emitters emit light whereby said light emitters are configured to alert on-coming traffic to a hazard.

12. The assembly according to claim 11, further including said power supply being electrically coupled to said actuator.

13. The assembly according to claim 1, further including said power supply comprising at least one battery.

14. A rotatably positionable warning sign assembly comprising:
   a primary member having a first end and a second end;
   a first arm having a first end and a second end, said first end of said first arm being rotatably coupled to said first end of said primary member such that a front wall of said first arm abuts a rear wall of said primary member, said first arm being positionable in a stored position such that said first arm is coextensive with said primary member, said first arm being positionable in a deployed position such that said second end of said first arm is positioned upwardly from a top wall of said primary member whereby said first arm forms a top portion of an end of an arrow extending from said first end of said primary member;

a second arm having a first end and a second end, said first end of said second arm being rotatably coupled to said primary member such that a rear wall of said second arm abuts a front wall of said primary member, said second arm being positionable in a stored position such that said second arm is coextensive with said primary member, said second arm being positionable in a deployed position such that said second end of said second arm is positioned downwardly from a bottom wall of said primary member whereby said second arm forms a bottom portion of the end of the arrow extending from said first end of said primary member, said first and second arms being positionable in said deployed position to form the arrow extending from said first end of said primary member whereby said first and second arms are configured to direct on-coming traffic around a hazard;

a pin extending through said first end of said primary member, said first end of said first arm and said first end of said second arm whereby said first arm is rotatably coupled to said primary member and said second arm is rotatably coupled to said first arm;

a plurality of light emitters being coupled to a front wall of said primary member, a front wall of said first arm and a front wall of said second arm whereby said light emitters are configured to be visible to on-coming traffic;

a pair of arcuate projections extending from said back wall of said primary member, distal ends of said arcuate projections being aligned and spaced apart such that said arcuate projections define a receiver oriented transversely relative to said primary member;

a tripod having a plurality of legs coupled to and extending downwardly from a top end of said tripod;

a projection extending upwardly from said top end of said tripod, an upper portion of said projection having a transverse cross-sectional shape complementary to said receiver, a lower portion of said projection defining a lip extending from said upper portion of said projection whereby said upper portion of said projection is insertable into said receiver whereby said primary member is coupled to said tripod and supported on said lip, a bottom end of said legs being configured to abut said support surface such that said primary member is supported above said support surface;

an actuator coupled to said primary member, said actuator being electrically coupled to said light emitters, said actuator actuating said light emitters such that said light emitters emit light whereby said light emitters are configured to alert on-coming traffic to a hazard;

a power supply coupled to said primary member, said power supply being electrically coupled to said actuator, said power supply comprising at least one battery.

\* \* \* \* \*